United States Patent
Wei et al.

(10) Patent No.: US 12,058,540 B2
(45) Date of Patent: Aug. 6, 2024

(54) METHODS, INFRASTRUCTURE EQUIPMENT AND WIRELESS COMMUNICATIONS NETWORKS FOR HANDLING BEAM FAILURES

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 375 days.

(21) Appl. No.: 17/606,452

(22) PCT Filed: Apr. 7, 2020

(86) PCT No.: PCT/EP2020/059850
§ 371 (c)(1),
(2) Date: Oct. 26, 2021

(87) PCT Pub. No.: WO2020/221561
PCT Pub. Date: Nov. 5, 2020

(65) Prior Publication Data
US 2022/0201513 A1    Jun. 23, 2022

(30) Foreign Application Priority Data
May 2, 2019 (EP) ..................... 19172424

(51) Int. Cl.
*H04W 24/04* (2009.01)
*H04W 24/08* (2009.01)
*H04W 74/0833* (2024.01)

(52) U.S. Cl.
CPC ........... *H04W 24/04* (2013.01); *H04W 24/08* (2013.01); *H04W 74/0833* (2013.01)

(58) Field of Classification Search
None
See application file for complete search history.

(56) References Cited

U.S. PATENT DOCUMENTS

2018/0123683 A1 *  5/2018  Wakabayashi ........ H04W 40/04
2019/0045569 A1 *  2/2019  Abedini ................ H04W 16/28
(Continued)

FOREIGN PATENT DOCUMENTS

WO   2020/051588 A1   3/2020
WO   2020/052344 A1   3/2020

OTHER PUBLICATIONS

International Search Report and Written Opinion mailed on Jul. 8, 2020, received for PCT Application PCT/EP2020/059850, Filed on Apr. 7, 2020, 14 pages.

(Continued)

*Primary Examiner* — Faiyazkhan Ghafoerkhan
(74) *Attorney, Agent, or Firm* — XSENSUS LLP

(57) ABSTRACT

A method of operating a first infrastructure equipment is provided. The method comprises communicating, signals representing data with a second infrastructure equipment over a first communications path optionally via one or more others of the infrastructure equipment acting as relay nodes, detecting that one or more of the beams used for communicating signals with a third infrastructure equipment satisfy a beam failure condition, determining, in response to detecting that the one or more of the beams satisfy the beam failure condition, that a beam failure notification is to be transmitted, the beam failure notification indicating that the one or more of the beams satisfy the beam failure condition, and transmitting the beam failure notification.

20 Claims, 10 Drawing Sheets

(56) References Cited

U.S. PATENT DOCUMENTS

| | | | | |
|---|---|---|---|---|
| 2019/0052344 | A1* | 2/2019 | Kundargi | H04B 17/24 |
| 2019/0098682 | A1* | 3/2019 | Park | H04L 1/08 |
| 2019/0253986 | A1* | 8/2019 | Jeon | H04L 5/0048 |
| 2019/0297555 | A1* | 9/2019 | Hampel | H04L 47/263 |
| 2019/0372887 | A1* | 12/2019 | Majmundar | H04L 45/22 |
| 2019/0394084 | A1* | 12/2019 | Tsai | H04L 47/27 |
| 2020/0053629 | A1* | 2/2020 | Majmundar | H04W 40/36 |
| 2020/0092784 | A1* | 3/2020 | Hampel | H04B 7/15528 |
| 2020/0389223 | A1* | 12/2020 | Guan | H04W 72/046 |
| 2021/0211928 | A1* | 7/2021 | Narasimha | H04W 88/14 |
| 2022/0038164 | A1* | 2/2022 | Wei | H04W 88/14 |
| 2022/0201513 | A1* | 6/2022 | Wei | H04W 76/19 |

OTHER PUBLICATIONS

3GPP, "NG-RAN; Architecture Description (Release 15)", 3GPP TS 38.401 V15.5.0, Mar. 2019, pp. 1-39.

Ericsson, "Recovery from Link Failure in IAB Networks", 3GPP TSG RAN WG3 Meeting #103, R3-190363, Feb. 25-Mar. 1, 2019, pp. 1-5.

Ericsson, "Handling of Link Failures in IAB Networks", 3GPP TSG-RAN WG2 #105, R2-1901386, Mar. 1, 2019, pp. 1-2.

AT&T et al., "New SID Proposal: Study on Integrated Access and Backhaul for NR", 8881123GPP TSG RAN Meeting #75, RP-170821, , Mar. 6-9, 2017, 5 pages.

Huawei et al., "Backhaul RLF Recovery", 3GPP TSG-RAN WG2#105bis, R2-1905171, Apr. 8-12, 2019, pp. 1-5.

Ericsson, "RLF Related Notifications in IAB networks", 3GPP TSG-RAN WG2 #105bis, R2-1903935, Apr. 8-12, 2019, pp. 1-4.

Ericsson, "(TP for NR-IAB BL CR for TS 38.401): Recovery From Link Failure in IAB Networks", 3GPP TSG RAN WG3 Meeting #103bis, R3-191372, Apr. 8-12, 2019, pp. 1-7.

Samsung, "IAB Failure Recovery as Part of Route Management", 3GPP TSG-RAN WG3 #101, R3-185312, Aug. 20-24, 2018, 2 pages.

3GPP, "Study on Integrated Access and Backhaul", 3GPP TR 38.874 V16.0.0, Dec. 2018, pp. 1-111.

Qualcomm et al., "Proposals on IAB Architecture", 3GPP TSG-RAN WG2 NR Ad hoc 1801, R2-1801606, Jan. 22-26, 2018, 7 pages.

3GPP, "Study on Integrated Access and Backhaul; (Release 15)", 3GPP TR 38.874 V0.1.0, Feb. 2018, pp. 1-11.

Holma et al., "LTE for UMTS OFDMA and SC-FDMA Based Radio Access", John Wiley & Sons, 2009, pp. 25-27.

3GPP, "NR; NR and NG-RAN Overall Description; Stage 2 (Release 15)", 3GPP TS 38.300 V15.4.0, Dec. 2018, pp. 1-97.

Qualcomm Inc., "Way Forward—IAB Architecture for L2/3 Relaying", 3GPP TSG-RAN WG3 Meeting #99bis, R3-181944, Apr. 16-20, 2018, 6 pages.

Huawei et al., "Revised Work Item Proposal: Enhancements of NB-IoT", 3GPP TSG RAN Meeting #73, RP-161901, Sep. 19-22, 2016, 8 pages.

"3rd Generation Partnership Project; Technical Specification Group Radio Access Network; NR; NR and NG-RAN Overall Description; Stage 2 (Release 15)", 3GPP Standard; Technical Specification; 3GPP TS 38.300, RAN WG2, V15.5.0, 92019-03. pp. 1-97.

Huawei, HiSilicon; "On backhaul link radio link failure handling for IAB", 3GPP TSG RAN WG1 Meeting#96, R1-1901535, Feb. 25, 2019-Mar. 1, 2019, Athens, Greece.

Intel Corporation, PHY layer enhancements for NR IAB, 3GPP TSG RAN WG1#95 R1-1812486, Nov. 12-Nov. 16, 2018, Spokane, USA.

Nokia, Nokia Shanghai Bell, "Backhaul link RLF handling", 3GPP TSG-RAN WG2 Meeting#105 R2-1900627, Feb. 25-Mar. 1, 2019, Athens, Greece.

* cited by examiner

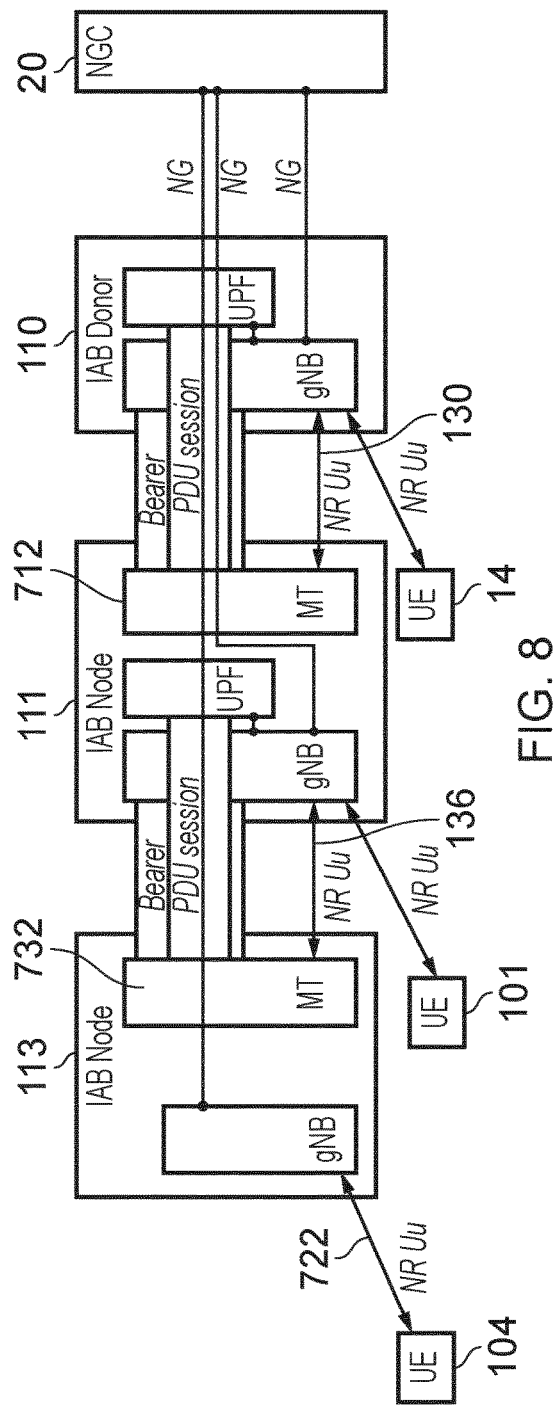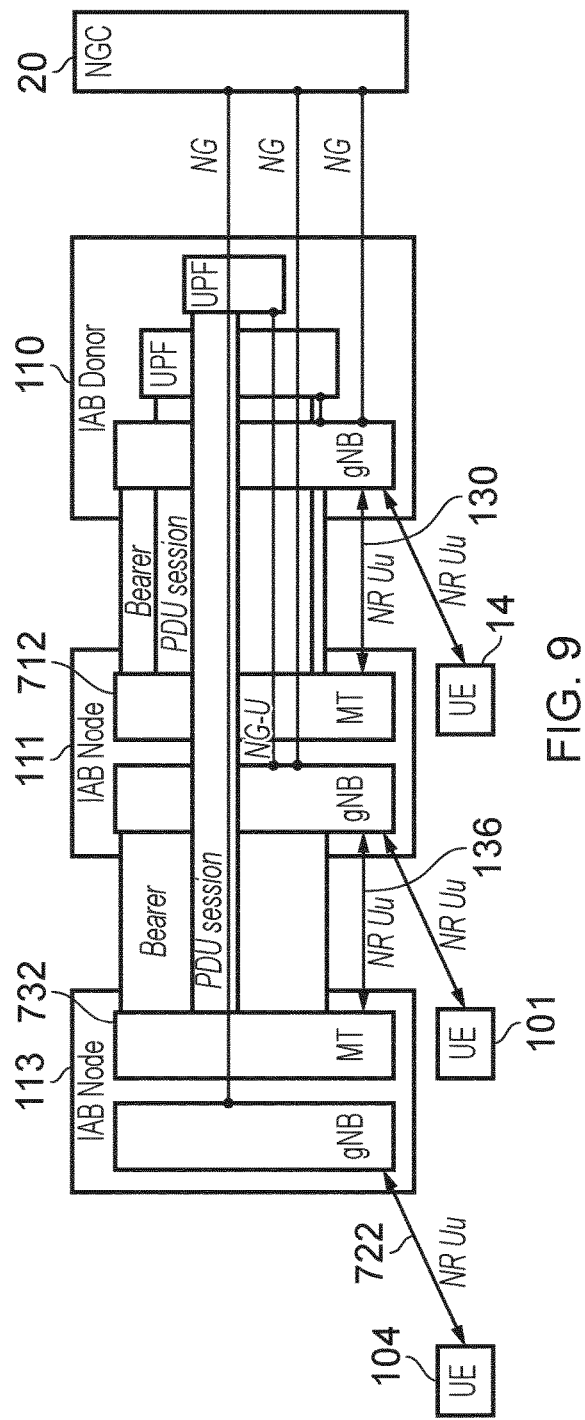

METHODS, INFRASTRUCTURE EQUIPMENT AND WIRELESS COMMUNICATIONS NETWORKS FOR HANDLING BEAM FAILURES

CROSS-REFERENCE TO RELATED APPLICATIONS

The present application is based on PCT filing PCT/EP2020/059850, filed Apr. 7, 2020, which claims priority to EP 19172424.4, filed May 2, 2019, the entire contents of each are incorporated herein by reference.

BACKGROUND

Field of Disclosure

The present disclosure relates to methods and apparatus for the communication of signals between various infrastructure equipment, communications devices and the core network on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this there is a need to ensure that a donor infrastructure equipment that is physically connected to the core network does not suffer from a "capacity crunch" when a large amount of data is being transmitted from various communications devices and infrastructure equipment to the core network via the donor infrastructure equipment. Furthermore, there is a need to ensure that links between various infrastructure equipment in the backhaul are both stable and reliable.

SUMMARY OF THE DISCLOSURE

The present disclosure can help address or mitigate at least some of the issues discussed above as defined in the appended claims.

Embodiments of the present technique can provide a method of operating a first infrastructure equipment. The first infrastructure equipment forms part of a wireless communications network comprising a plurality of other infrastructure equipment, the first infrastructure equipment being configured to communicate with one or more of the plurality of other infrastructure equipment via a backhaul communications link by periodically transmitting a plurality of beams of radio signals in at least one of different spatial directions and at different times, one or more of the first infrastructure equipment and the plurality of other infrastructure equipment each being configured to communicate with one or more communications devices via an access link The first infrastructure equipment is either a donor node connected to a core network part of the wireless communications network or a relay node configured to relay signals between a donor node and one or more of the plurality of other infrastructure equipment. The method comprises communicating, signals representing data with a second of the infrastructure equipment over a first communications path optionally via one or more others of the infrastructure equipment acting as relay nodes, the second infrastructure equipment being a child node and the first infrastructure equipment being a parent node connected to the child node via a backhaul communications link and configured to allocate communications resources to the child node, detecting that one or more of the beams used for communicating signals with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment, determining, in response to detecting that the one or more of the beams satisfy the beam failure condition, that a beam failure notification is to be transmitted to the child node, the beam failure notification indicating that the one or more of the beams satisfy the beam failure condition, and transmitting, to the child node, the beam failure notification.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 8 is a block diagram illustrating a second possible network architecture for providing a wireless backhaul by means of IAB in a wireless telecommunication network which may be configured to operate in accordance with certain embodiments of the present disclosure;

FIG. 9 is a block diagram illustrating a third possible network architecture for providing a wireless backhaul by means of IAB in a wireless telecommunication network which may be configured to operate in accordance with certain embodiments of the present disclosure;

DETAILED DESCRIPTION OF THE EMBODIMENTS

Long Term Evolution (LTE) Wireless Communications System

Figure 1:
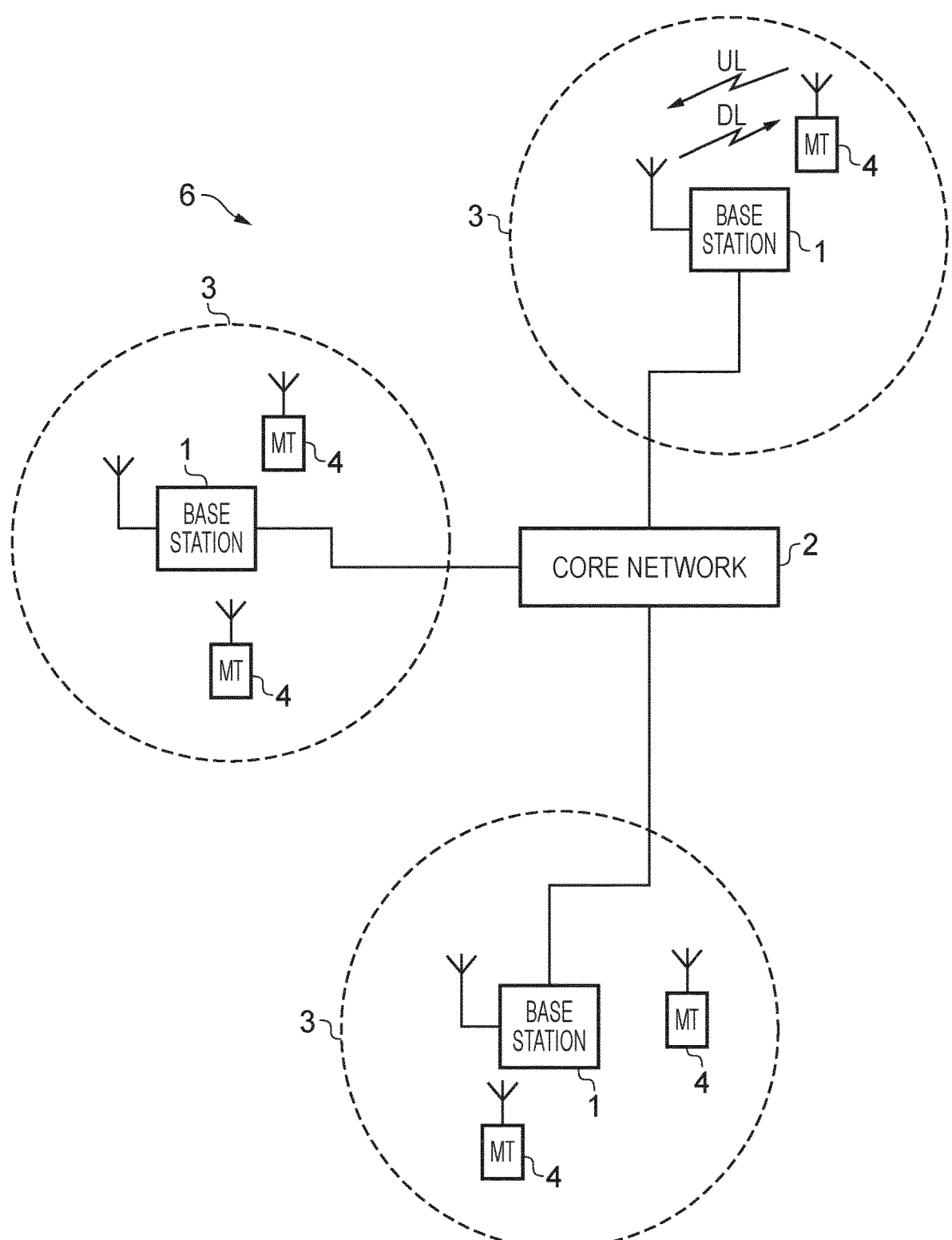
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1].It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
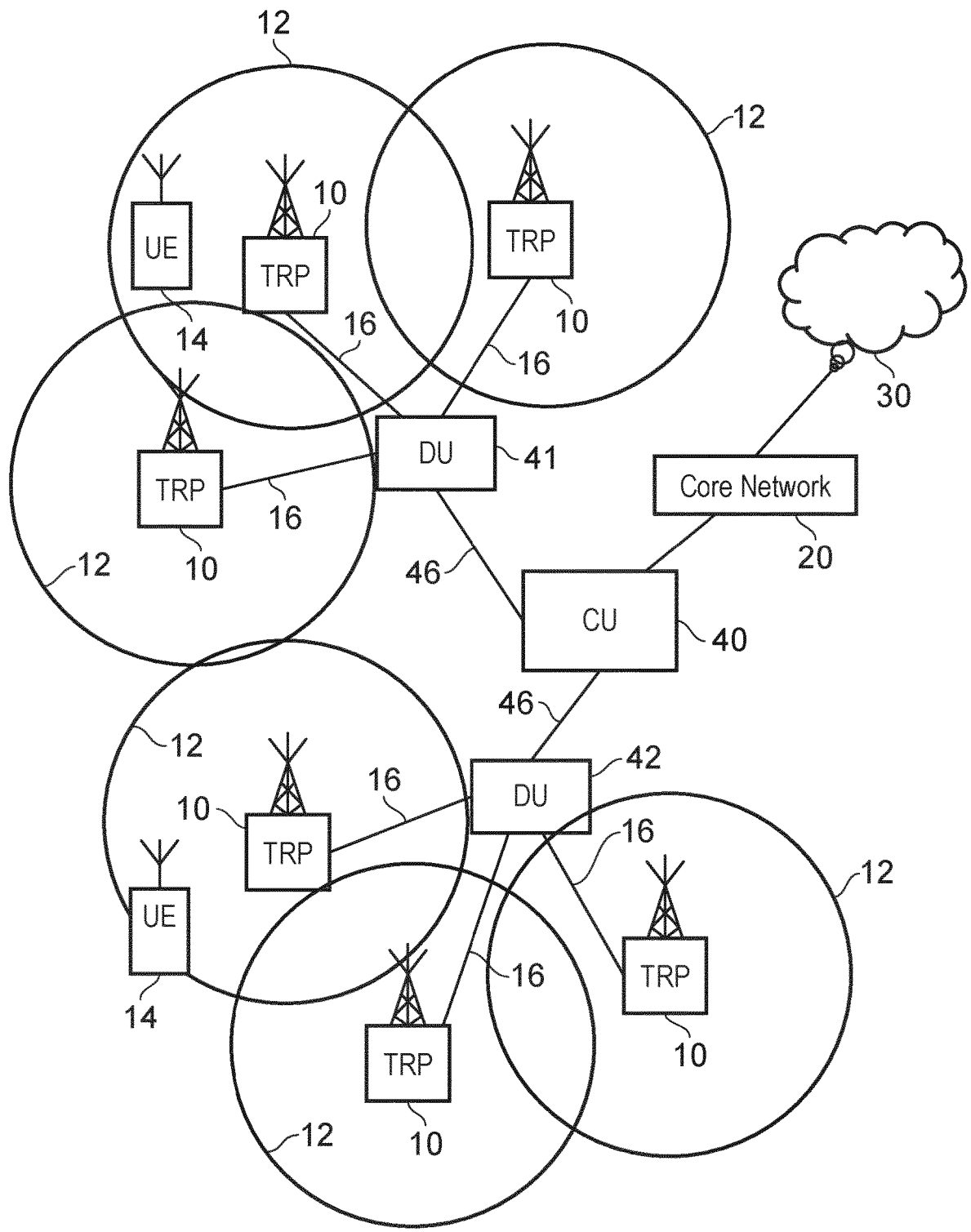
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
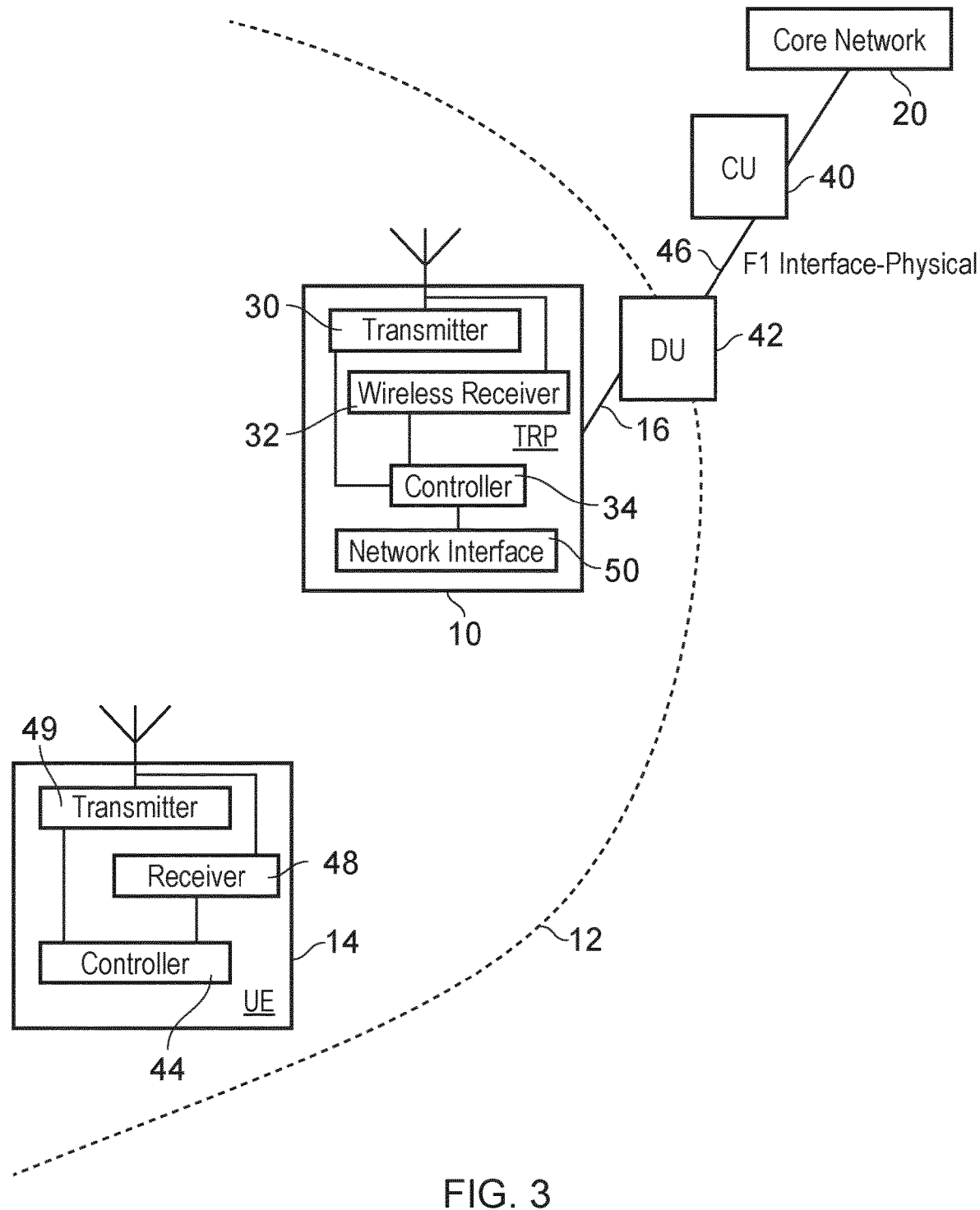
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44,48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Figure 4:
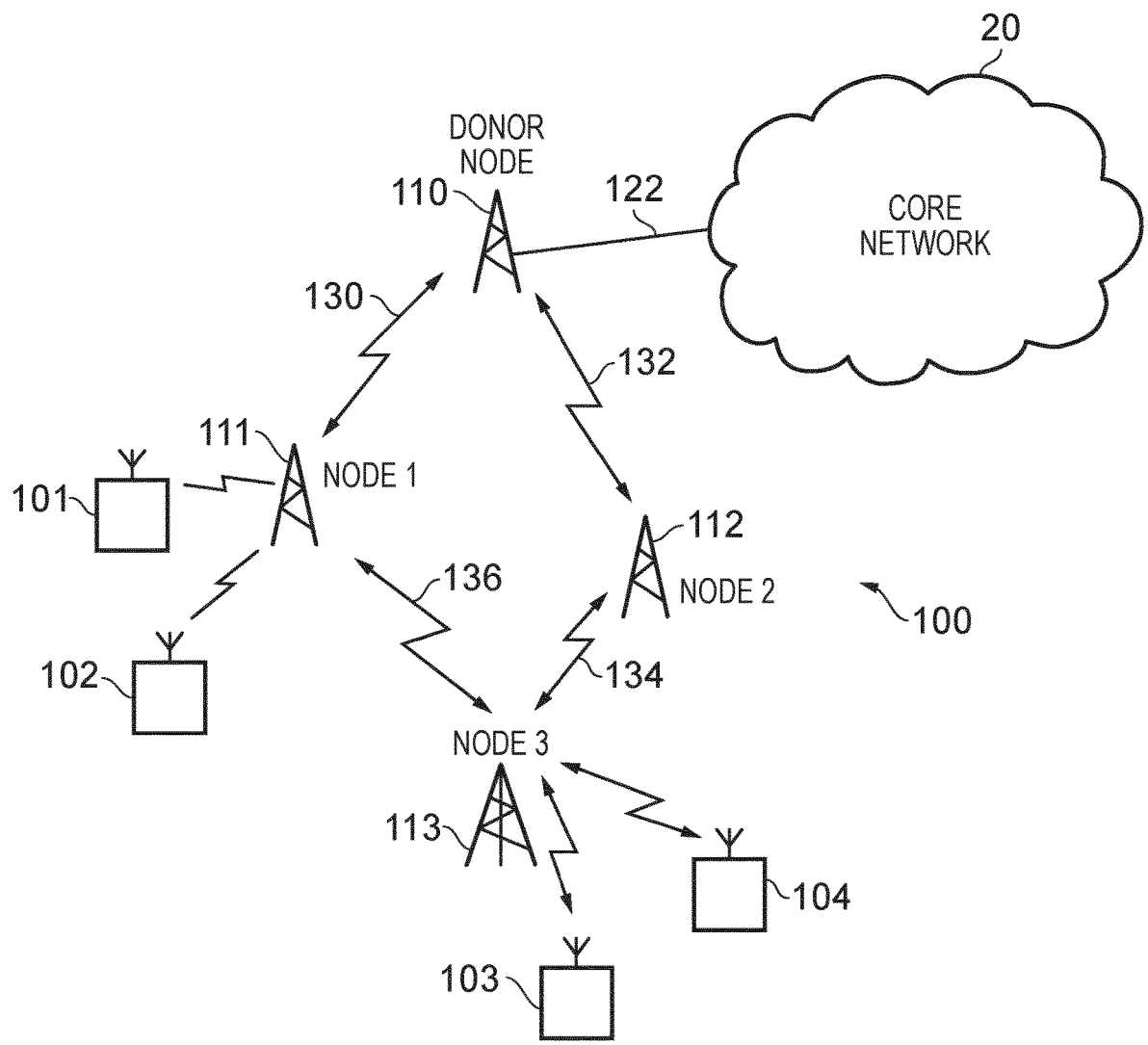
FIG. 4 schematically represents some aspects of an example wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink/downlink data from/to a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present technique, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+ ("3G"), LTE and related standards including LTE-A ("4G"), and NR ("5G"). Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

A new study item on Integrated Access and Backhaul for NR [3] has been approved. Several requirements and aspects for the integrated access and wireless backhaul for NR to address are discussed in [3], which include:

Efficient and flexible operation for both inband and outband relaying in indoor and outdoor scenarios;
  Multi-hop and redundant connectivity;
  End-to-end route selection and optimisation;
  Support of backhaul links with high spectral efficiency;
  Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
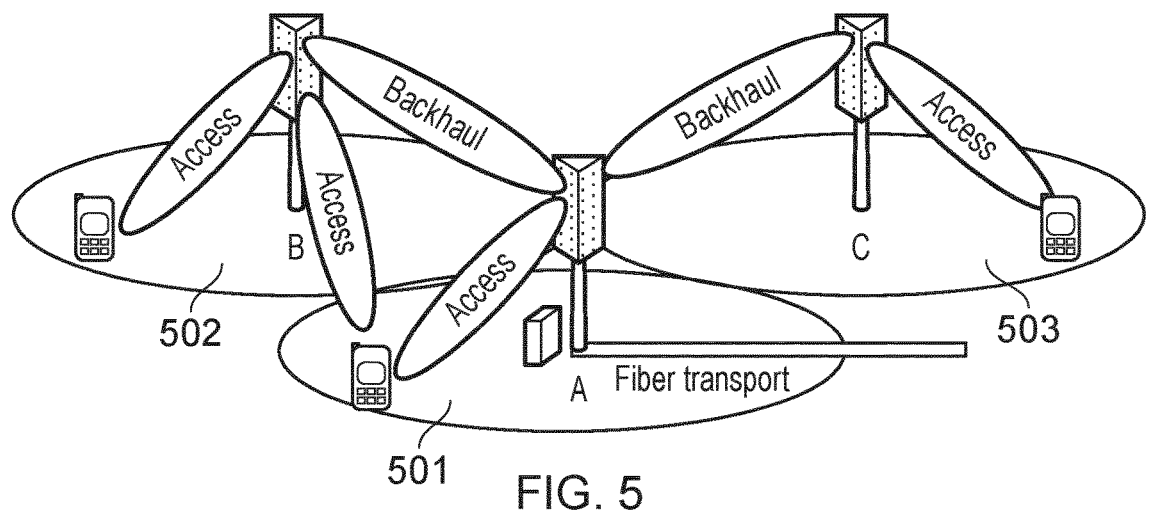
FIG. 5 is reproduced from [3], and provides a first example of an Integrated Access and Backhaul (IAB) deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signalling load, and Release 15 NR specifications should be reused as much as possible in the design of the backhaul link, with enhancements considered.

Figure 6A:
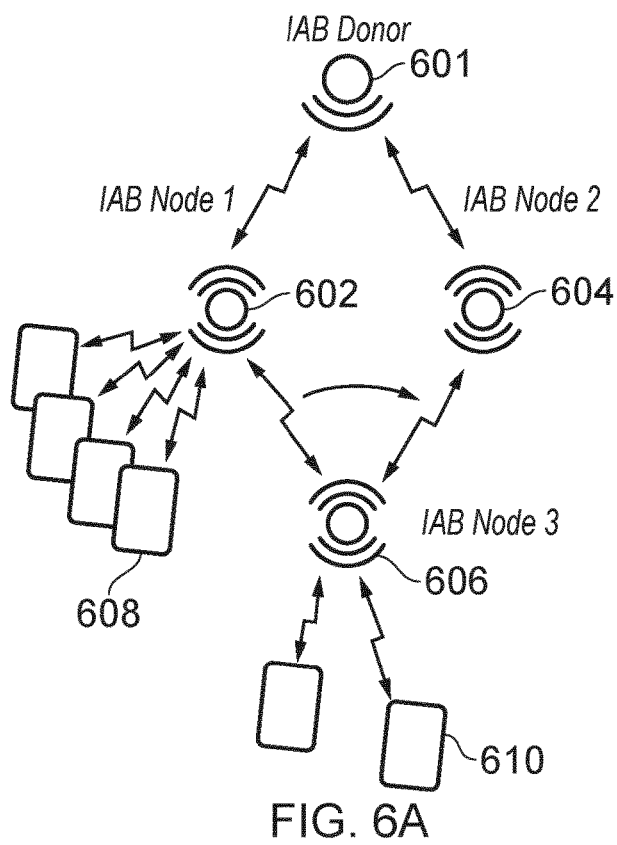
FIG. 6A is reproduced from [5], and provides a second example of an IAB deployment scenario in which there are multiple candidate routes each comprising multiple hops from the end node to the donor node.

FIG. 6A is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 have wireless access connections to UEs 608 and 610 respectively. As shown in FIG. 6A, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 link Hence, knowing how to manage the candidate routes efficiently and effectively is important to ensure timely data transmission between relay nodes, especially when considering the characteristics of wireless links In the case that the link between the first IAB node 602 and the third IAB node 606 is deteriorating, or the first IAB node 602 becomes overloaded, one of the nodes in the system (this could be the donor node 601 or the first IAB node 602 itself) will need to make a decision to change the route from the third IAB node 606 to the IAB donor node 601 from that via the first IAB node 602 to that via the second IAB node 604.

In FIG. 6A, only the IAB Donor gNB 601 has a fixed line backhaul into the core network. It should be assumed in this case that the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In the relevant art, the first IAB Node 602 in such a system as that of FIG. 6A is called a "hop"—it relays communications between the end (third) IAB node 606 and the donor IAB node 601. The backhaul link to the first IAB Node 602 requires enough capacity to support the traffic from all the UEs 610, bearing in mind that some of these may have stringent quality of service (QoS) requirements that translate into high traffic intensities.

Figure 6B:
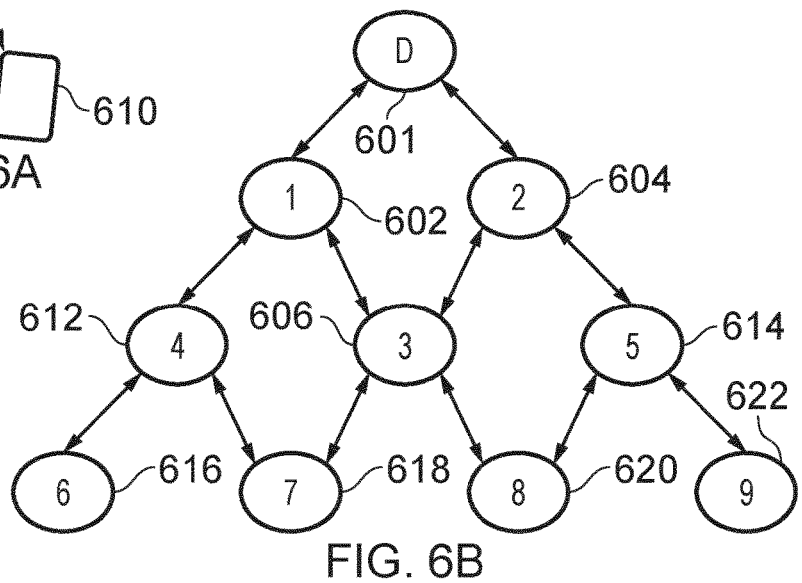
FIG. 6B is an extended version of FIG. 6A, providing a third example of an IAB deployment scenario in which there are multiple candidate routes each comprising multiple hops from the end node to the donor node.

FIG. 6B is an extended version of FIG. 6A, and shows what happens when there are multiple layers of IAB nodes in the deployment scenario. In the example of FIG. 6A, the third IAB node 606 is the child node of the first IAB node 602, and the first IAB node 602 may be the parent node of the third IAB node 606. However, a parent node may not necessarily be the next node up (i.e. one hop in the uplink direction) towards the IAB donor node 601. A parent node may be more than one hop away from its child node or children nodes, and is in a general sense configured to allocate uplink communications resources to the child node. For example, the donor IAB node 601 may in fact be the parent node of the third IAB node 606. This is shown with greater clarity in FIG. 6B.

In FIG. 6B, in addition to IAB node 601, 602, 604 and 606 as shown in FIG. 6A, there are additional IAB nodes 612 and 614 at the same layer or level of the network as IAB node 606. Below these are IAB nodes 616, 618, 620 and 622, which are now end nodes, in that they have no downlink backhaul connections to other IAB nodes. Here, it could be that the first IAB node 602 is still the parent of the third IAB node 606, but may also be the parent of IAB node 612. Further, the first IAB node 602 may be the parent of IAB nodes 616, 618 and 620 too, or may be a grandparent node to these nodes if nodes 606 and 612 are their parents. Furthermore, some child nodes may have multiple parent nodes, and can select from between them when transmitted uplink data in dependence on certain criteria, such as relative link qualities between the child node and its multiple parent nodes, or a relative load status between the parent nodes, for example.

Various architectures have been proposed in order to provide the IAB functionality. The below described embodiments of the present technique are not restricted to a particular architecture. However, a number of candidate architectures which have been considered in, for example, 3GPP document [6] are described below.

Figure 7:
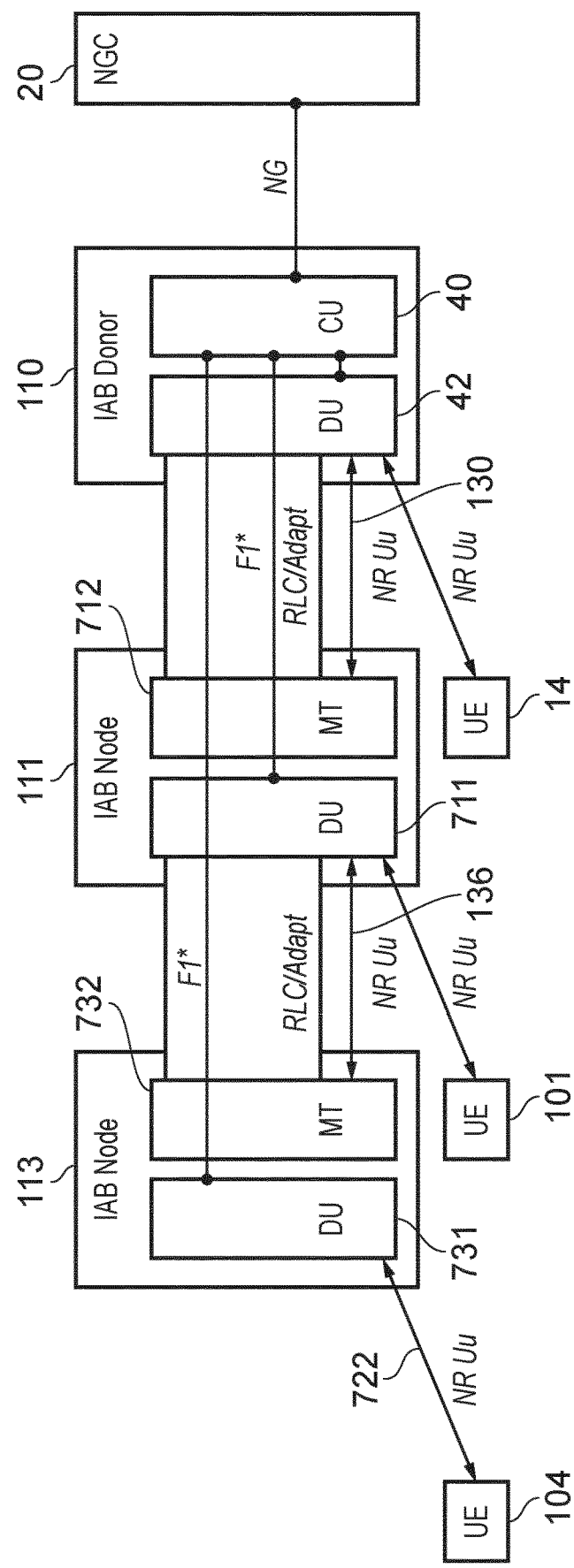
FIG. 7 is a block diagram illustrating a first possible network architecture for providing a wireless backhaul by means of IAB in a wireless telecommunication network which may be configured to operate in accordance with certain embodiments of the present disclosure.

FIG. 7 illustrates one possible architecture, sometimes referred to as "Architecture 1a", by which the donor Node 110, the Node 1 111 and the Node 3 113 may provide a wireless backhaul to provide connectivity for the UEs 104, 101, 14.

In FIG. 7, each of the infrastructure equipment acting as an IAB nodes 111, 113 and the donor node 110, includes a distributed unit (DU) 42, 711, 731 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 720 which is used by the Node 1 111 for communication with the donor node 110 may also be used by the UE 14 to transmit and receive data to and from the donor node 110.

Similarly, an end node (such as the Node 3 113) may provide a Uu wireless interface 722 for the fourth UE 104 to communicate with the DU 731 of the Node 3 113.

Alternative candidate architectures for the provision of IAB are provided in FIG. 8 and FIG. 9, sometimes referred to as "Architectures 2a and 2b" respectively. In both FIG. 8 and FIG. 9, each IAB node includes a gNB function, providing a wireless access interface for the use of downstream IAB nodes and wireless communications devices.

FIG. 9 differs from FIG. 7 in that, in FIG. 7, PDU sessions are connected end-on-end to form the wireless backhaul; in FIG. 9, PDU sessions are encapsulated so that each IAB node may establish an end-to-end PDU session which terminates at the IAB donor node 110.

Radio Link Failure (RLF)

A number of radio link failure (RLF) scenarios have been agreed in [7]. These scenarios are illustrated and explained with respect to FIGS. 10A, 10B and 10C, which have been reproduced from [7]. Each of FIG. 10A, 10B and 10C show example IAB networks each comprising two donor IAB nodes; donor node A1 1002 and donor node A2 1004.

Figure 10A:
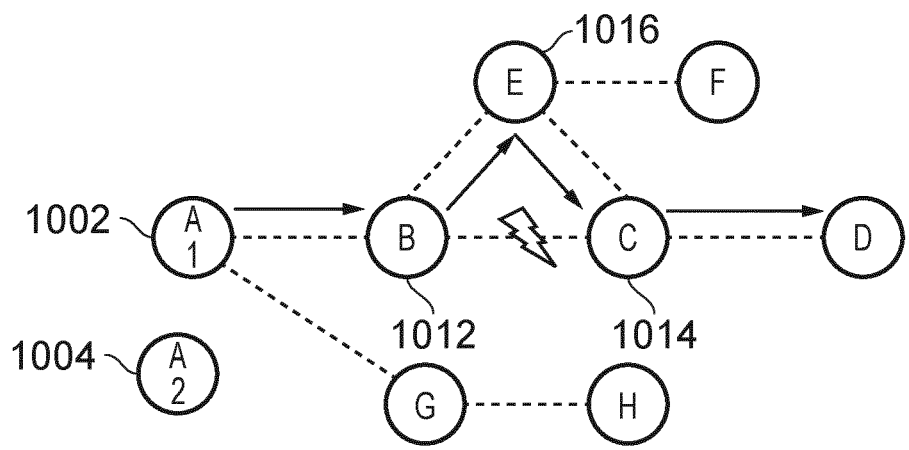
FIG. 10A is reproduced from [7], and shows a first example radio link failure example in IAB networks.

A first scenario is shown in FIG. 10A. Here, the RLF occurs between one of the parent IAB nodes (e.g. node B 1012) and the child IAB node (e.g., node C 1014), but the child node 1014 has an additional link established to another parent node, (e.g. node E 1016). When such an RLF occurs between the child node 1014 and parent node 1012, the child node 1014 can simply fall back on the other parent node 1016, which is able to relay communications between the child node 1014 and the donor node 1002 via the original parent node 1012.

Figure 10B:
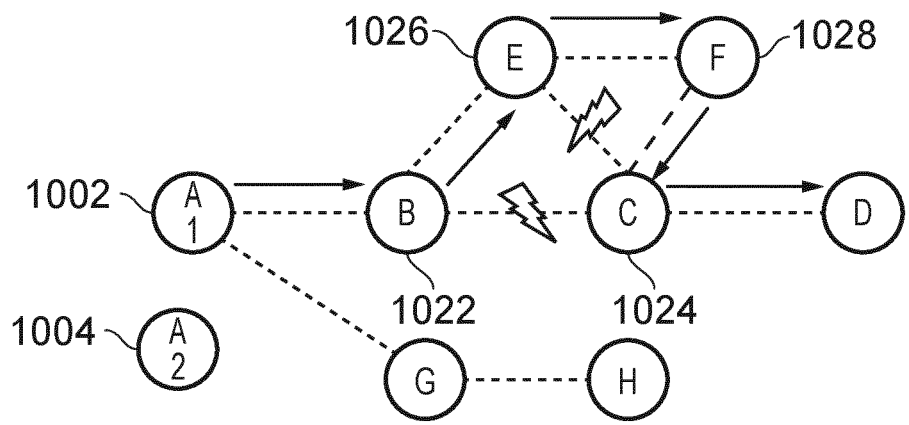
FIG. 10B is reproduced from [7], and shows a second example radio link failure example in IAB networks.

A second scenario is shown in FIG. 10B. Here, the RLF occurs between all parent IAB nodes (e.g., node B 1022 and E 1026) and the child IAB node (e.g., node C 1024). The child node 1024 therefore has no working links to any of its known parent nodes 1022, 1026, and so has to reconnect to a new parent node. In the example of FIG. 10B, the child node 1024 establishes a new connection with new parent node F 1028, which is able to relay communications between the child node 1024 and the donor node 1002 via both original parent nodes 1022, 1026.

Figure 10C:
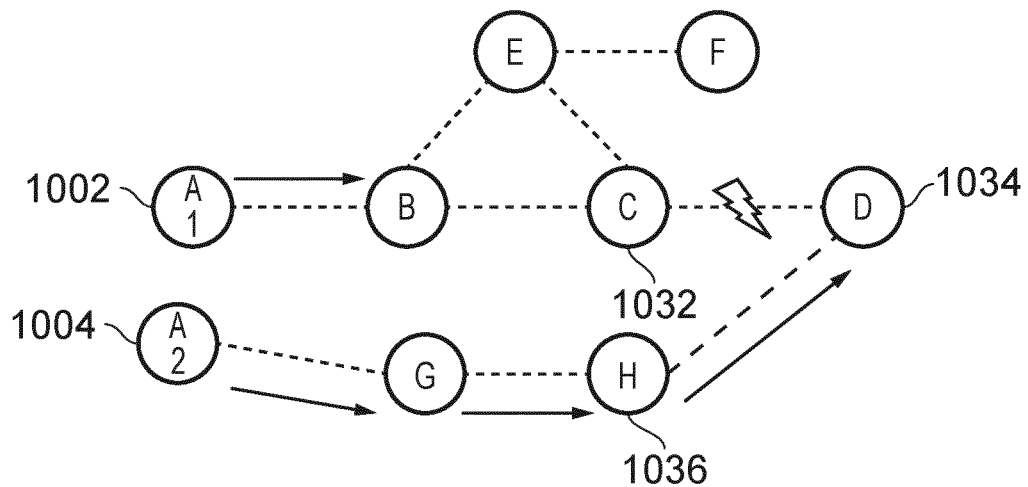
FIG. 10C is reproduced from [7], and shows a third example radio link failure example in IAB networks.

A third scenario is shown in FIG. 10C. Here, RLF occurs between a parent node C 1032 and its child node D 1034. However unlike the second scenario as described above by way of FIG. 10B, there are no candidates available as a new parent node for the child node 1034 to establish a new connection with in order to communicate to the donor node 1002. The child node 1034 therefore has to reconnect to the other IAB donor node 1004 via a new route. This is achieved by reconnecting to a new parent node on the new route, which in the example of FIG. 10C is IAB node H 1036. Thus, the child node 1034 is still able to communicate on the uplink to a donor node 1004 which is connected to the core network.

Beam Failure Recovery in NR

According to some radio access technologies, including the NR radio access technologies under development by 3GPP, a cell may be formed (or, in other words, 'generated') by a plurality of directional beams. Each beam may be characterised by a variance in gain with respect to a direction from the antenna; a beam may be considered 'wide', where the gain is consistently relatively high over a broad range of directions, or 'narrow', where relatively high gain is only achieved over a narrow range of directions. Depending on the direction of the communications device with respect to the infrastructure equipment, the gain of a particular beam may be sufficiently high (and the resulting coupling loss sufficiently low) to permit communications between the communications device and the infrastructure equipment via the beam. Beams may be formed for transmitting or receiving at the infrastructure equipment using phased antenna arrays, directional antennas, a combination of both, or other known techniques. Generally, a beam is named as a Transmission Configuration Indication (TCI) state in NR.

Provided at least one activated beam (or TCI state) remains available for communication, then beam management processes can update and adapt the set of activated beams in response to one or more beams becoming unsuitable. Such beam management as used herein refers collectively to processes and techniques such as the measurement of signals transmitted on one or more beams, an assessment as to whether one or more beams satisfy respective beam failure conditions, indications transmitted by the communications device to the infrastructure equipment to indicate whether or not one or more beams satisfy respective beam failure conditions, a determination that the configuration or activated set of beams are modified, and transmissions indicating control information relating to the beams sent using an activated beam which has not satisfied the beam failure conditions. However, should all beams satisfy the beam failure conditions based on measurements from pre-configured reference signals, then it is necessary to initiate a procedure to recover from this situation. This procedure is referred to as beam failure recovery.

In more detail for NR, the beam failure recovery (BFR) procedure is introduced in [8]. As described in [8], for beam failure detection, the gNodeB configures the UE with beam failure detection reference signals and the UE declares beam failure when the number of beam failure instance indications from the physical layer reaches a configured threshold within a configured period. After beam failure is detected, the UE:

triggers beam failure recovery by initiating a Random Access procedure on the PCell;

selects a suitable beam to perform beam failure recovery (if the gNodeB has provided dedicated Random Access resources for certain beams, those will be prioritised by the UE);

Receives gNodeB responses (i.e. DCI) on a preconfigured search space named as "recoverySearchSpaceId".

Upon completion of the Random Access procedure, beam failure recovery is considered complete.

In an example beam failure recovery procedure initiated in response to a determination that activated beams satisfy the respective beam failure conditions, the communications device performs measurements of the signal strength (e.g. reference signal received power, RSRP) of the channel state information reference signals (CSI-RS) or synchronisation signal blocks associated with one or more beams which are configured but not activated. The measurements may be compared against a predetermined threshold, such as an RSRP threshold. If the communications device determines that the measurements associated with the one or more beams which are configured but not activated exceed the predetermined threshold, then the communications device transmits a beam failure recovery request message (which is an example of a beam failure indication) as a random access message using a physical random access channel (PRACH) of the new identified beam. Communications resources on the PRACH may have been previously indicated as suitable for non-contention based random access transmissions, in which case the beam failure recovery request message may be transmitted in a contention-free manner using those resources. Otherwise, the beam failure recovery request message may be transmitted in a contention based manner if dedicated resources are not configured.

After transmitting the beam failure recovery request message, the communications device monitors downlink communications resources associated with the new identified beam. More specifically, the communications device may monitor a configured recovery search space, which may be a 'recoverySearchSpace' as described above with relation to [8], having as an identity a 'recoverySearchSpaceId', for downlink control information (DCI). If the communications device receives downlink control information in the configured communications resources, which indicates that communications resources on a shared downlink channel (such as the physical downlink shared channel, PDSCH) are scheduled to be used for the transmission by the infrastructure equipment of a response to the beam failure recovery request message, then the communications device determines that the beam failure recovery is successful. In response to receiving the downlink control information, the communications device sets the new identified beam as an activated beam. The new (activated) beam can be used for subsequent communications between the infrastructure equipment and the communications device, including the transmission of control information to indication one or more beams which are to be activated for the communications device. The communications device may decode and process data transmitted using the scheduled communications resources on the shared downlink channel, for example in a conventional manner.

In [4], it is described that an IAB node supports mechanisms for detection and recovering from backhaul link failure based on release 15 mechanisms. In particular, it is stated that enhancements to BFR and RLF procedures are beneficial and should be supported for NR IAB, including those to support the interaction between BFR success indication and RLF.

Referring again to FIGS. 6A and 6B, when the first IAB node 602 encounters a beam failure with its parent node e.g. IAB donor 601, it will initiate a RACH procedure to a new candidate beam. If beam failure recovery fails, a RLF procedure will be triggered. According to the latest RAN2 agreements, a notification will be sent to its child nodes (e.g. the third IAB node 606) only when the RLF happens. However, in Rel-16 IAB, the IAB nodes are static (i.e. mobility is not supported) and so the beam failure problem may indicate a permanent physical link problem. In this case, if we wait until beam failure recovery fails and only afterwards start the RLF procedure, it will normally take a longer time which is not preferable for the backhaul link recovery. Therefore some mechanisms are needed in order to quickly recover from beam failure on the backhaul link Embodiments of the present technique seek to provide such mechanisms.

Beam Failure Recovery in IAB

Figure 11:
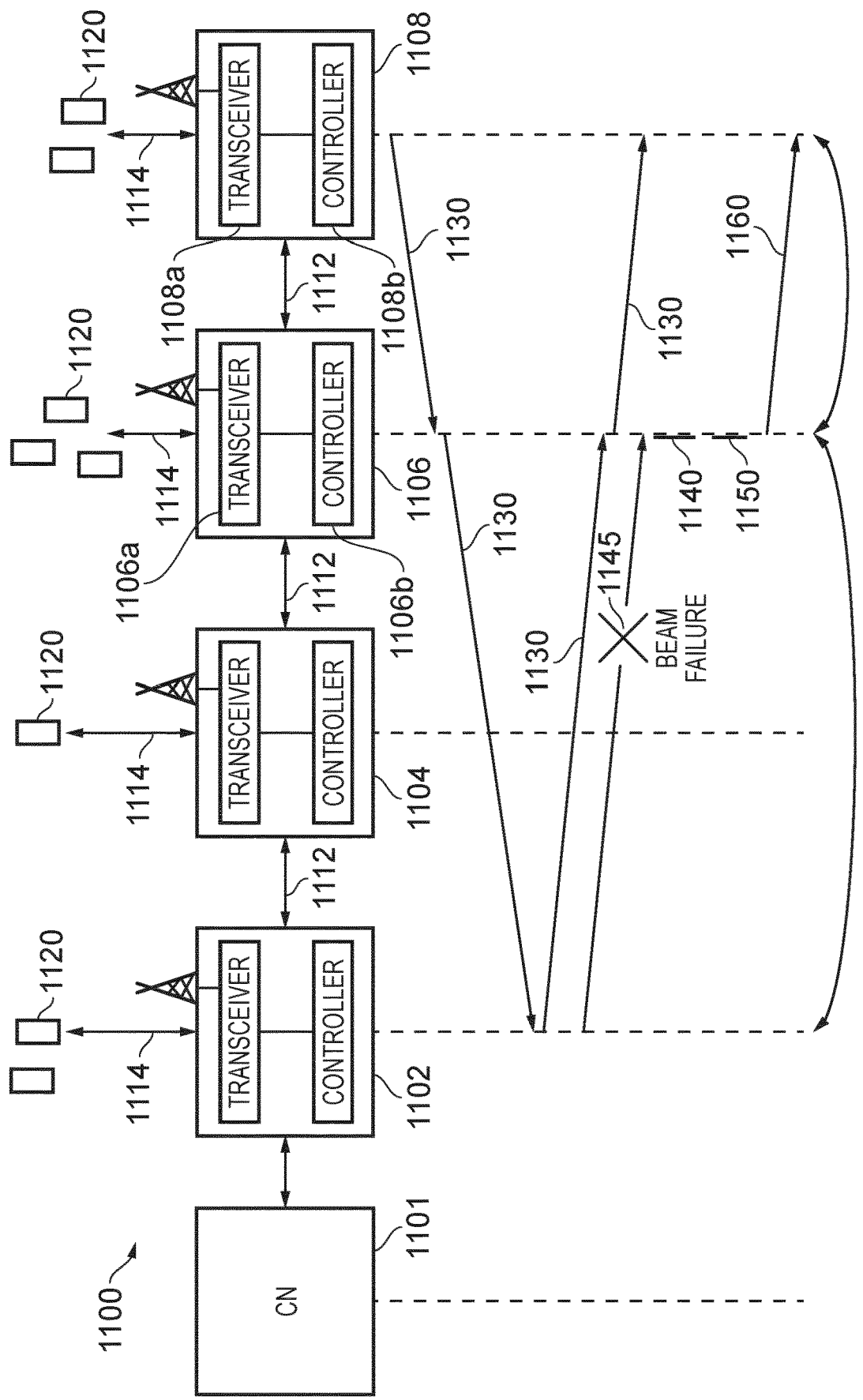
FIG. 11 shows a part schematic, part message flow diagram of communications in a wireless communications system in accordance with embodiments of the present technique.

FIG. 11 shows a part schematic, part message flow diagram of communications in a wireless communications network 1100 in accordance with embodiments of the present technique. The wireless communications network 1100 comprises a plurality of infrastructure equipment 1102, 1104, 1106, 1108 each being configured to communicate with one or more others of the infrastructure equipment 1102, 1104, 1106, 1108 via a backhaul communications link 1112 by periodically transmitting a plurality of beams (or Transmission Configuration Indication (TCI) states) of radio signals in at least one of different spatial directions and at different times, one or more of the infrastructure equipment 1102, 1104, 1106, 1108 each being configured to communicate with one or more communications devices 1120 via an access link 1114. A second of the infrastructure equipment 1108 comprises transceiver circuitry 1108a and controller circuitry 1108b which are configured in combination to communicate 1130, with one of the infrastructure equipment 1102 acting as a donor node connected to a core network 1101 part of the wireless communications network 1100, signals representing data over a first communications path via one or more others of the infrastructure equipment 1106 acting as relay nodes, the second infrastructure equipment 1108 being a child node and a first of the one or more other infrastructure equipment 1106 acting as the relay nodes or the donor node being a parent node connected to the child node 1108 via a backhaul communications link and configured to allocate communications resources to the child node 1108. The first infrastructure equipment 1106 comprises transceiver circuitry 1106a and controller circuitry 1106b which are configured in combination to detect 1140 that one or more of the beams 1145 used for communicating signals with a third infrastructure equipment 1102 satisfy a beam failure condition (the third infrastructure equipment 1102 being either of the donor node 1102 or one of the one or more others of the infrastructure equipment 1104 acting as relay nodes), the third infrastructure equipment 1102 being a parent node to the first infrastructure equipment 1106, to determine 1150, in response to detecting 1140 that the one or more of the beams 1145 satisfy the beam failure condition, that a beam failure notification is to be transmitted to the child node 1108, the beam failure notification indicating that the one or more of the beams 1145 satisfy the beam failure condition, and to transmit 1160, to the child node 1106, the beam failure notification.

The example of FIG. 11 shows the first communications path as being a route between the child node 1108 and the original donor node 1102, but it should be appreciated that in embodiments of the present technique, the first or other communications paths could be routes between the child node 1108 and a second donor node which is different to the original donor node 1102. It should also be appreciated that although a specific parent node 1106 is shown in FIG. 11, the parent node to a child node could alternatively be either one of the donor nodes or one of the other infrastructure equipment acting as relay nodes along any of the communications paths. Additionally, the child node 1108 may have a connection to more than one parent node. Though the example of FIG. 11 shows and describes the third infrastructure equipment (i.e. the parent node of the first infrastructure equipment 1106) as being the donor node 1102, this third infrastructure equipment could also be the infrastructure equipment 1104; i.e. a node upstream of the first infrastructure equipment 1106, but not the donor node 1102. The donor node 1102 may be a central unit (CU) node connected directly to the core network 1101, or may be a distributed control unit (DU) node connected to the core network 1101 via a separate CU node.

The beam failure condition may be a beam failure instance notification (received from the third infrastructure equipment) indicating that the one or more of the beams that satisfy the beam failure condition have failed. Alternatively, the beam failure condition may comprise a determination by the first infrastructure equipment itself that a measured characteristic of signals received and/or transmitted using the one or more of the beams that satisfy the beam failure condition falls below a predetermined threshold. Here, this measured characteristic may be at least one of a relative quality of the received and/or transmitted signals, a power with which the signals are received and/or transmitted, and an error rate of the received and/or transmitted signals.

Essentially then, in embodiments of the present technique, when a beam failure instance indication has been received by an IAB node from lower layers of an upstream (i.e. parent of the IAB node) node, a beam failure notification will be transmitted from the IAB node to its downstream (i.e. child of the IAB node) node(s). This notification could be transmitted via dedicated radio resource control (RRC) signalling (over the first communications path), broadcast signalling, in a medium access control (MAC) control element (CE) (over the first communications path) or physical layer signalling (over the first communications path). The contents of this notification may include a Node ID associated with the upstream/parent node (i.e. the parent of the IAB node with which it suffers the beam failure), and a type of the notification; i.e. in this instance that it is a beam failure notification.

In order to limit the number of beam failure notification, in some arrangements of embodiments of the present technique, a beam failure instance counter can be configured, to be for example 1, 2, or 10. A beam failure notification will then be sent only when the number of consecutive beam failures (whether through received beam failure instance indications) is beyond the number of this counter within a predetermined period. In other words, the first infrastructure equipment is configured to compare the number of the one or more of the beams that satisfy the beam failure condition with a beam failure instance threshold within a predetermined period, and to determine that the beam failure notification is to be transmitted to the child node only if the number of the one or more of the beams that satisfy the beam failure condition exceeds the beam failure instance threshold within the predetermined period. This beam failure instance threshold may be configured in a dynamic manner by the parent node (e.g. the first infrastructure equipment) or the donor node, or may be fixed and predetermined (and known by each of the nodes in the communications system).

After the downstream/child node receives this beam failure notification, it could perform one or more of the following actions:

Activate a new route to avoid the problematic upstream node; in other words, the child node is configured, in response to receiving the beam failure notification, to communicate with the donor node over a second communications path via one or more of the infrastructure equipment acting as relay nodes instead of the first communications path, the second communications path being different to the first communications path and the first infrastructure equipment not forming part of the second communications path (here, the child node may initiate a procedure to select a new parent node, or such a procedure may be initiated by one of the donor node, current parent node, or target/candidate parent node);

Initiate dual connectivity if it is supported by the child node; in other words, the child node is configured, in response to receiving the beam failure notification, to communicate with the donor node over a second communications path via one or more of the infrastructure equipment acting as relay nodes in addition to the first communications path, the second communications path being different to the first communications path and the first infrastructure equipment not forming part of the second communications path;

If it can't find any alternative route, it will notify its downstream nodes; in other words, the child node is configured, in response to receiving the beam failure notification, to determine that the child node is not able to communicate with the donor node over another communications path to the first communications path, and to transmit, in response to determining that the child node is not able to communicate with the donor node over another communications path to the first communications path, the beam failure notification to one or more downstream infrastructure equipment for which the child node is configured to allocate resources to; and Initiate flow control to its downstream node e.g. to allocate less UL grant to its downstream nodes; in other words, the child node is configured, in response to receiving the beam failure notification, to allocate, to one or more downstream infrastructure equipment for which the child node is configured to allocate uplink resources to, fewer uplink resources than an amount of uplink resources allocated by the child node before receiving the beam failure notification.

In at least some arrangements of the present technique, before the upstream/parent node initiates a beam failure recovery procedure (for example, initiates a RACH with its parent node with which it suffered beam failure) a beam failure recovery notification will be transmitted from the upstream/parent node to its downstream/child node(s) in order to notify the downstream/child node that it will start the beam failure recovery procedure. In other words, the first infrastructure equipment is configured to transmit, to the child node in advance of initiating a beam failure recovery procedure, a beam failure recovery notification indicating that the first infrastructure equipment is going to initiate the beam failure recovery procedure. As with the beam failure notification above, this beam failure recovery notification could be transmitted via dedicated RRC signalling (over the first communications path), broadcast signalling, in a MAC CE (over the first communications path) or physical layer signalling (over the first communications path).

The contents of the beam failure recovery notification may include a Node ID associated with the upstream/parent node (i.e. the parent of the IAB node with which it suffers the beam failure), and a type of the notification; i.e. in this instance that it is a beam failure recovery notification.

Following the transmission of the beam failure recovery notification to the child node, the parent node may then be configured to initiate the beam failure recovery procedure. As described above, in some arrangements of embodiments of the present technique, the beam failure recovery procedure comprises performing a random access, RACH, procedure to initiate communication with the third infrastructure equipment using one or more new beams instead of the one or more of the beams that satisfy the beam failure condition. These new beams may form part of the same cell or a different cell to the beams that have failed.

As with the beam failure notification as described above, after the downstream/child node receives this beam failure recovery notification, it could perform one or more of the following actions:

Activate a new route to avoid the problematic upstream node; in other words, the child node is configured, in response to receiving the beam failure recovery notification, to communicate with the donor node over a second communications path via one or more of the infrastructure equipment acting as relay nodes instead of the first communications path, the second communications path being different to the first communications path and the first infrastructure equipment not forming part of the second communications path (here, the child node may initiate a procedure to select a new parent node, or such a procedure may be initiated by one of the donor node, current parent node, or target/candidate parent node);

Initiate dual connectivity if it is supported by the child node; in other words, the child node is configured, in response to receiving the beam failure recovery notification, to communicate with the donor node over a second communications path via one or more of the infrastructure equipment acting as relay nodes in addition to the first communications path, the second communications path being different to the first communications path and the first infrastructure equipment not forming part of the second communications path;

If it can't find any alternative route, it will notify its downstream nodes; in other words, the child node is configured, in response to receiving the beam failure recovery notification, to determine that the child node is not able to communicate with the donor node over another communications path to the first communications path, and to transmit, in response to determining that the child node is not able to communicate with the donor node over another communications path to the first communications path, the beam failure recovery notification to one or more downstream infrastructure equipment for which the child node is configured to allocate resources to; and Initiate flow control to its downstream node e.g. to allocate less UL grant to its downstream nodes; in other words, the child node is configured, in response to receiving the beam failure recovery notification, to allocate, to one or more downstream infrastructure equipment for which the child node is configured to allocate uplink resources to, fewer uplink resources than an amount of uplink resources allocated by the child node before receiving the beam failure recovery notification.

In at least some arrangements of the present technique, after the upstream/parent node successfully recovers from the beam failure, a beam failure recovery success notification will be transmitted from the upstream/parent node to its downstream/child node(s). In other words, the first infrastructure equipment is configured to determine that the beam failure recovery procedure has been successfully completed, and to transmit, to the child node subsequently to determining that the beam failure recovery procedure has been successfully completed, a beam failure recovery success notification indicating that the first infrastructure equipment has successfully completed the beam failure recovery procedure. As with the beam failure and beam failure recovery notifications above, this beam failure recovery success notification could be transmitted via dedicated RRC signalling (over the first communications path), broadcast signalling, in a MAC CE (over the first communications path) or physical layer signalling (over the first communications path). The contents of the beam failure recovery success notification may include a Node ID associated with the upstream/parent node (i.e. the parent of the IAB node with which it suffers the beam failure), and a type of the notification; i.e. in this instance that it is a beam failure recovery success notification.

After the downstream/child node receives this beam failure recovery success notification, it could perform one or more of the following actions:

Deactivate any backup route(s) if they are configured; in other words, the child node is configured, in response to receiving the beam failure recovery success notification, to deactivate one or more other communications paths to the first communications path over each of which the child node had been communicating with the donor node via one or more of the infrastructure equipment acting as relay nodes, each of the one or more other communications paths being different to the first communications path; and Initiate flow control to its downstream node e.g. to allocate more UL grant to its downstream nodes; in other words, the child node is configured, in response to receiving the beam failure recovery success notification, to allocate, to one or more downstream infrastructure equipment for which the child node is configured to allocate uplink resources to, more uplink resources than an amount of uplink resources allocated by the child node before receiving the beam failure recovery success notification.

In an arrangement of embodiments of the present technique, when BFR happens, a RLF will be triggered. In other words, the first infrastructure equipment is configured to determine, in response to detecting that the one or more of the beams satisfy the beam failure condition, that a radio link failure, RLF, between the first infrastructure equipment and the third infrastructure equipment has been triggered, and to transmit an indication of the RLF to the child node. Correspondingly, the child node may be configured to receive an indication from the first infrastructure equipment that a radio link failure, RLF, between the first infrastructure equipment and the third infrastructure equipment has been triggered.

Flow Chart Representation

Figure 12:
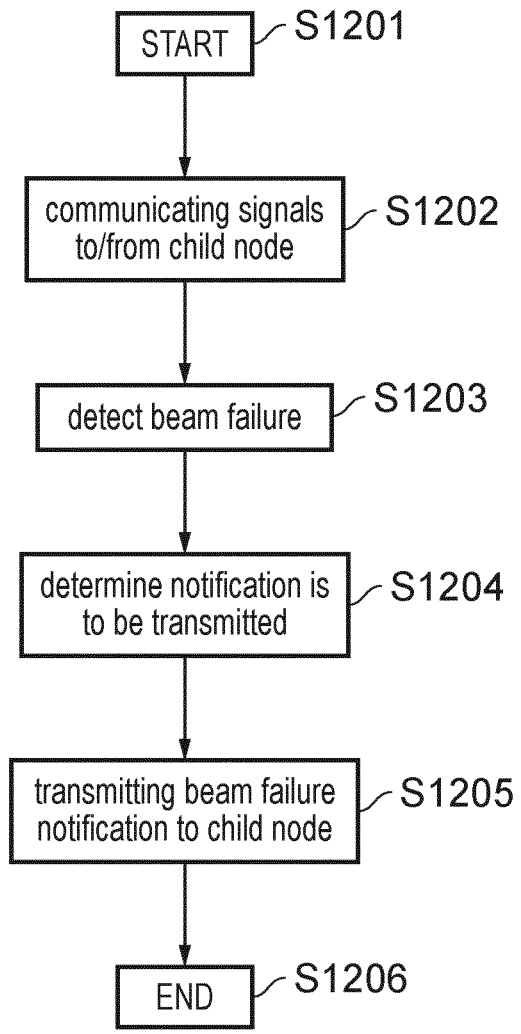
FIG. 12 shows a flow diagram illustrating a process of communications in a communications system in accordance with embodiments of the present technique.

FIG. 12 shows a flow diagram illustrating a process of communications in a communications system in accordance with embodiments of the present technique. The process shown by FIG. 12 is a method of operating a first infrastructure equipment forming part of a wireless communications network comprising a plurality of other infrastructure equipment, the first infrastructure equipment being configured to communicate with one or more of the plurality of other infrastructure equipment via a backhaul communications link by periodically transmitting a plurality of beams of radio signals in at least one of different spatial directions and at different times, one or more of the first infrastructure equipment and the plurality of other infrastructure equipment each being configured to communicate with one or more communications devices via an access link, wherein the first infrastructure equipment is either a donor node connected to a core network part of the wireless communications network or a relay node configured to relay signals between a donor node and one or more of the plurality of other infrastructure equipment.

The method begins in step S1201. The method comprises, in step S1202, communicating signals representing data with a second of the infrastructure equipment over a first communications path optionally via one or more others of the infrastructure equipment acting as relay nodes, the second infrastructure equipment being a child node and the first infrastructure equipment being a parent node connected to the child node via a backhaul communications link and configured to allocate communications resources to the child node. In step S1203, the method comprises detecting that one or more of the beams used for communicating signals with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment. In step S1204, the process comprises determining, in response to detecting that the one or more of the beams satisfy the beam failure condition, that a beam failure notification is to be transmitted to the child node, the beam failure notification indicating that the one or more of the beams satisfy the beam failure condition. In step S1205, the process involves transmitting, to the child node, the beam failure notification. The process ends in step S1206.

Those skilled in the art would appreciate that the method shown by FIG. 12 may be adapted in accordance with embodiments of the present technique. For example, other intermediate steps may be included in the method, or the steps may be performed in any logical order.

Though embodiments of the present technique have been described largely by way of the example system shown in FIG. 11, it would be clear to those skilled in the art that they could be equally applied to other systems, where for example there may be many more nodes or paths to choose from, or more hops between the donor and end nodes.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

The following numbered paragraphs provide further example aspects and features of the present technique:

Paragraph 1. A method of operating a first infrastructure equipment forming part of a wireless communications network comprising a plurality of other infrastructure equipment, the first infrastructure equipment being configured to communicate with one or more of the plurality of other infrastructure equipment via a backhaul communications link by periodically transmitting a plurality of beams of radio signals in at least one of different spatial directions and at different times, one or more of the first infrastructure equipment and the plurality of other infrastructure equipment each being configured to communicate with one or more communications devices via an access link, wherein the first infrastructure equipment is either a donor node connected to a core network part of the wireless communications network or a relay node configured to relay signals between a donor node and one or more of the plurality of other infrastructure equipment, the method comprising communicating signals representing data with a second of the infrastructure equipment over a first communications path optionally via one or more others of the infrastructure equipment acting as relay nodes, the second infrastructure equipment being a child node and the first infrastructure equipment being a parent node connected to the child node via a backhaul communications link and configured to allocate communications resources to the child node, detecting that one or more of the beams used for communicating signals with a third of the infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment, determining, in response to detecting that the one or more of the beams satisfy the beam failure condition, that a beam failure notification is to be transmitted to the child node, the beam failure notification indicating that the one or more of the beams satisfy the beam failure condition, and transmitting, to the child node, the beam failure notification.

Paragraph 2. A method according to Paragraph 1, wherein the beam failure notification is transmitted to the child node via at least one of:

dedicated radio resource control, RRC, signalling over the first communications path, broadcast signalling, a medium access control, MAC, control element, CE, over the first communications path, and physical layer signalling over the first communications path.

Paragraph 3. A method according to Paragraph 1 or Paragraph 2, wherein the beam failure notification comprises an indication of an identifier of the third infrastructure equipment and an indication of a notification type of the beam failure notification.

Paragraph 4. A method according to any of Paragraphs 1 to 3, comprising comparing the number of the one or more of the beams that satisfy the beam failure condition with a beam failure instance threshold within a predetermined period, and determining that the beam failure notification is to be transmitted to the child node only if the number of the one or more of the beams that satisfy the beam failure condition exceeds the beam failure instance threshold within the predetermined period.

Paragraph 5. A method according to any of Paragraphs 1 to 4, comprising transmitting, to the child node in advance of initiating a beam failure recovery procedure, a beam failure recovery notification indicating that the first infrastructure equipment is going to initiate the beam failure recovery procedure.

Paragraph 6. A method according to Paragraph 5, wherein the beam failure recovery notification is transmitted to the child node via at least one of:

dedicated RRC signalling over the first communications path, broadcast signalling, a MAC CE over the first communications path, and physical layer signalling over the first communications path.

Paragraph 7. A method according to Paragraph 5 or Paragraph 6, wherein the beam failure recovery notification comprises an indication of an identifier of the third infrastructure equipment and an indication of a notification type of the beam failure recovery notification.

Paragraph 8. A method according to any of Paragraphs 5 to 7, comprising initiating the beam failure recovery procedure, wherein the beam failure recovery procedure comprises performing a random access, RACH, procedure to initiate communication with the third infrastructure equipment using one or more new beams instead of the one or more of the beams that satisfy the beam failure condition.

Paragraph 9. A method according to any of Paragraphs 5 to 8, comprising
determining that the beam failure recovery procedure has been successfully completed, and
transmitting, to the child node subsequently to determining that the beam failure recovery procedure has been successfully completed, a beam failure recovery success notification indicating that the first infrastructure equipment has successfully completed the beam failure recovery procedure.

Paragraph 10. A method according to Paragraph 9, wherein the beam failure recovery success notification is transmitted to the child node via at least one of:
dedicated RRC signalling over the first communications path,
broadcast signalling,
a MAC CE over the first communications path, and
physical layer signalling over the first communications path.

Paragraph 11. A method according to Paragraph 9 or Paragraph 10, wherein the beam failure recovery success notification comprises an indication of an identifier of the third infrastructure equipment and an indication of a notification type of the beam failure recovery success notification.

Paragraph 12. A method according to any of Paragraphs 1 to 11, comprising
determining, in response to detecting that the one or more of the beams satisfy the beam failure condition, that a radio link failure, RLF, between the first infrastructure equipment and the third infrastructure equipment has been triggered, and
transmitting an indication of the RLF to the child node.

Paragraph 13. A method according to any of Paragraphs 1 to 12, wherein each of the plurality of beams is associated with one of a plurality of transmission configuration indication, TCI, states.

Paragraph 14. A method according to any of Paragraphs 1 to 13, wherein the beam failure condition comprises a determination by the first infrastructure equipment that a measured characteristic of signals received and/or transmitted using the one or more of the beams that satisfy the beam failure condition falls below a predetermined threshold.

Paragraph 15. A method according to Paragraph 14, wherein the measured characteristic is at least one of a relative quality of the received and/or transmitted signals, a power with which the signals are received and/or transmitted, and an error rate of the received and/or transmitted signals.

Paragraph 16. A method according to any of Paragraphs 1 to 15, wherein the beam failure condition comprises receiving, by the first infrastructure equipment, a beam failure instance notification from the third infrastructure equipment indicating that the one or more of the beams that satisfy the beam failure condition have failed.

Paragraph 17. A method according to any of Paragraphs 1 to 16, wherein the donor node is a central unit node and is directly connected to the core network.

Paragraph 18. A method according to any of Paragraphs 1 to 17, wherein the donor node is connected to the core network via a central unit node.

Paragraph 19. A first infrastructure equipment forming part of a wireless communications network comprising a plurality of other infrastructure equipment, the first infrastructure equipment being configured to communicate with one or more of the plurality of other infrastructure equipment via a backhaul communications link by periodically transmitting a plurality of beams of radio signals in at least one of different spatial directions and at different times, one or more of the first infrastructure equipment and the plurality of other infrastructure equipment each being configured to communicate with one or more communications devices via an access link, wherein the first infrastructure equipment is either a donor node connected to a core network part of the wireless communications network or a relay node configured to relay signals between a donor node and one or more of the plurality of other infrastructure equipment, wherein the first infrastructure comprises transceiver circuitry and controller circuitry which are configured in combination
to communicate signals representing data with a second of the infrastructure equipment over a first communications path optionally via one or more others of the infrastructure equipment acting as relay nodes, the second infrastructure equipment being a child node and the first infrastructure equipment being a parent node connected to the child node via a backhaul communications link and configured to allocate communications resources to the child node,
to detect that one or more of the beams used for communicating signals with a third of the infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment,
to determine, in response to detecting that the one or more of the beams satisfy the beam failure condition, that a beam failure notification is to be transmitted to the child node, the beam failure notification indicating that the one or more of the beams satisfy the beam failure condition, and
to transmit, to the child node, the beam failure notification.

Paragraph 20. Circuitry for a first infrastructure equipment forming part of a wireless communications network comprising a plurality of other infrastructure equipment, the first infrastructure equipment being configured to communicate with one or more of the plurality of other infrastructure equipment via a backhaul communications link by periodically transmitting a plurality of beams of radio signals in at least one of different spatial directions and at different times, one or more of the first infrastructure equipment and the plurality of other infrastructure equipment each being configured to communicate with one or more communications devices via an access link, wherein the first infrastructure equipment is either a donor node connected to a core network part of the wireless communications network or a relay node configured to relay signals between a donor node and one or more of the plurality of other infrastructure equipment, wherein the first infrastructure comprises transceiver circuitry and controller circuitry which are configured in combination
to communicate signals representing data with a second of the infrastructure equipment over a first communications path optionally via one or more others of the infrastructure equipment acting as relay nodes, the second infrastructure equipment being a child node and the first infrastructure equipment being a parent node being connected to the child node via a backhaul communications link and configured to allocate communications resources to the child node,
to detect that one or more of the beams used for communicating signals with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment, to determine, in response to detecting that the one or more of the beams satisfy the beam failure condition, that a beam failure notification is to be transmitted to the child node, the beam failure notification indicating that the one or more of the beams satisfy the beam failure condition, and to transmit, to the child node, the beam failure notification.

Paragraph 21. A method of operating a second infrastructure equipment forming part of a wireless communications network comprising a plurality of other infrastructure equipment, the second infrastructure equipment being configured to communicate with one or more of the plurality of other infrastructure equipment via a backhaul communications link by periodically transmitting a plurality of beams of radio signals in at least one of different spatial directions and at different times, one or more of the second infrastructure equipment and the plurality of other infrastructure equipment each being configured to communicate with one or more communications devices via an access link, the method comprising communicating, with one of the infrastructure equipment acting as a donor node connected to a core network, the core network being part of the wireless communications network, signals representing data over a first communications path via one or more others of the infrastructure equipment acting as relay nodes, the second infrastructure equipment being a child node and a first of the one or more other infrastructure equipment acting as the relay nodes being a parent node, the child node being connected to the first infrastructure equipment via a backhaul communications link and configured to receive communications resources allocations from the first infrastructure equipment, and receiving, from the first infrastructure equipment, a beam failure notification indicating that one or more of the beams used for communicating signals by the first infrastructure equipment with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment.

Paragraph 22. A method according to Paragraph 21, wherein the beam failure notification is received by the child node via at least one of:
dedicated RRC signalling over the first communications path,
broadcast signalling,
a MAC CE over the first communications path, and
physical layer signalling over the first communications path.

Paragraph 23. A method according to Paragraph 21 or Paragraph 22, wherein the beam failure notification comprises an indication of an identifier of the third infrastructure equipment and an indication of a notification type of the beam failure notification.

Paragraph 24. A method according to any of Paragraphs 21 to 23, comprising, in response to receiving the beam failure notification,
communicating with the donor node over a second communications path via one or more of the infrastructure equipment acting as relay nodes instead of the first communications path, the second communications path being different to the first communications path and the first infrastructure equipment not forming part of the second communications path.

Paragraph 25. A method according to any of Paragraphs 21 to 24, comprising, in response to receiving the beam failure notification,
ommunicating with the donor node over a second communications path via one or more of the infrastructure equipment acting as relay nodes in addition to the first communications path, the second communications path being different to the first communications path and the first infrastructure equipment not forming part of the second communications path.

Paragraph 26. A method according to any of Paragraphs 21 to 25, comprising, in response to receiving the beam failure notification,
determining that the child node is not able to communicate with the donor node over another communications path to the first communications path, and
transmitting, in response to determining that the child node is not able to communicate with the donor node over another communications path to the first communications path, the beam failure notification to one or more downstream infrastructure equipment for which the child node is configured to allocate uplink resources to.

Paragraph 27. A method according to any of Paragraphs 21 to 26, comprising, in response to receiving the beam failure notification,
allocating, to one or more downstream infrastructure equipment for which the child node is configured to allocate uplink resources to, fewer uplink resources than an amount of uplink resources allocated by the child node before receiving the beam failure notification.

Paragraph 28. A method according to any of Paragraphs 21 to 27, comprising
receiving, from the first infrastructure equipment, a beam failure recovery notification indicating that the first infrastructure equipment is going to initiate a beam failure recovery procedure.

Paragraph 29. A method according to Paragraph 28, wherein the beam failure recovery notification is received by the child node via at least one of:
dedicated RRC signalling over the first communications path,
broadcast signalling,
a MAC CE over the first communications path, and
physical layer signalling over the first communications path.

Paragraph 30. A method according to Paragraph 28 or Paragraph 29, wherein the beam failure recovery notification comprises an indication of an identifier of the third infrastructure equipment and an indication of a notification type of the beam failure recovery notification.

Paragraph 31. A method according to any of Paragraphs 28 to 30, comprising, in response to receiving the beam failure recovery notification,
communicating with the donor node over a second communications path via one or more of the infrastructure equipment acting as relay nodes instead of the first communications path, the second communications path being different to the first communications path and the first infrastructure equipment not forming part of the second communications path.

Paragraph 32. A method according to any of Paragraphs 28 to 31, comprising, in response to receiving the beam failure recovery notification, communicating with the donor node over a second communications path via one or more of the infrastructure equipment acting as relay nodes in addition to the first communications path, the second communications path being different to the first communications path and the first infrastructure equipment not forming part of the second communications path.

Paragraph 33. A method according to any of Paragraphs 28 to 32, comprising, in response to receiving the beam failure recovery notification, determining that the child node is not able to communicate with the donor node over another communications path to the first communications path, and transmitting, in response to determining that the child node is not able to communicate with the donor node over another communications path to the first communications path, the beam failure recovery notification to one or more downstream infrastructure equipment for which the child node is configured to allocate uplink resources to.

Paragraph 34. A method according to any of Paragraphs 28 to 33, comprising, in response to receiving the beam failure recovery notification, allocating, to one or more downstream infrastructure equipment for which the child node is configured to allocate uplink resources to, fewer uplink resources than an amount of uplink resources allocated by the child node before receiving the beam failure recovery notification.

Paragraph 35. A method according to any of Paragraphs 28 to 34, comprising receiving, from the first infrastructure equipment, a beam failure recovery success notification indicating that the first infrastructure equipment has successfully completed the beam failure recovery procedure.

Paragraph 36. A method according to Paragraph 35, wherein the beam failure recovery success notification is received by the child node via at least one of:

dedicated RRC signalling over the first communications path, broadcast signalling, a MAC CE over the first communications path, and physical layer signalling over the first communications path.

Paragraph 37. A method according to Paragraph 35 or Paragraph 36, wherein the beam failure recovery success notification comprises an indication of an identifier of the third infrastructure equipment and an indication of a notification type of the beam failure recovery success notification.

Paragraph 38. A method according to any of Paragraphs 35 to 37, comprising, in response to receiving the beam failure recovery success notification, deactivating one or more other communications paths to the first communications path over each of which the child node had been communicating with the donor node via one or more of the infrastructure equipment acting as relay nodes, each of the one or more other communications paths being different to the first communications path.

Paragraph 39. A method according to any of Paragraphs 35 to 38, comprising, in response to receiving the beam failure recovery success notification, allocating, to one or more downstream infrastructure equipment for which the child node is configured to allocate uplink resources to, more uplink resources than an amount of uplink resources allocated by the child node before receiving the beam failure recovery success notification.

Paragraph 40. A method according to any of Paragraphs 21 to 39, comprising receiving an indication from the first infrastructure equipment that a radio link failure, RLF, between the first infrastructure equipment and the third infrastructure equipment has been triggered.

Paragraph 41. A method according to any of Paragraphs 21 to 40, wherein each of the plurality of beams is associated with one of a plurality of transmission configuration indication, TCI, states.

Paragraph 42. A second infrastructure equipment forming part of a wireless communications network comprising a plurality of other infrastructure equipment, the second infrastructure equipment being configured to communicate with one or more of the plurality of other infrastructure equipment via a backhaul communications link by periodically transmitting a plurality of beams of radio signals in at least one of different spatial directions and at different times, one or more of the second infrastructure equipment and the plurality of other infrastructure equipment each being configured to communicate with one or more communications devices via an access link, wherein the second infrastructure equipment comprises transceiver circuitry and controller circuitry which are configured in combination to communicate, with one of the infrastructure equipment acting as a donor node connected to a core network, the core network being part of the wireless communications network, signals representing data over a first communications path via one or more others of the infrastructure equipment acting as relay nodes, the second infrastructure equipment being a child node and a first of the one or more other infrastructure equipment acting as the relay nodes being a parent node, the child node being connected to the first infrastructure equipment via a backhaul communications link and configured to receive communications resources allocations from the first infrastructure equipment, and to receive, from the first infrastructure equipment, a beam failure notification indicating that one or more of the beams used for communicating signals by the first infrastructure equipment with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment.

Paragraph 43. Circuitry for a second infrastructure equipment forming part of a wireless communications network comprising a plurality of other infrastructure equipment, the second infrastructure equipment being configured to communicate with one or more of the plurality of other infrastructure equipment via a backhaul communications link by periodically transmitting a plurality of beams of radio signals in at least one of different spatial directions and at different times, one or more of the second infrastructure equipment and the plurality of other infrastructure equipment each being configured to communicate with one or more communications devices via an access link, wherein the second infrastructure equipment comprises transceiver circuitry and controller circuitry which are configured in combination to communicate, with one of the infrastructure equipment acting as a donor node connected to a core network, the core network being part of the wireless communications network, signals representing data over a first communications path via one or more others of the infrastructure equipment acting as relay nodes, the second infrastructure equipment being a child node and a first of the one or more other infrastructure equipment acting as the relay nodes being a parent node, the child node being connected to the first infrastructure equipment via a backhaul communications link and configured to receive communications resources allocations from the first infrastructure equipment, and to receive, from the first infrastructure equipment, a beam failure notification indicating that one or more of the beams used for communicating signals by the first infrastructure equipment with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment.

Paragraph 44. A method of controlling communications within a wireless communications network comprising a plurality of infrastructure equipment each being configured to communicate with one or more others of the infrastructure equipment via a backhaul communications link by periodically transmitting a plurality of beams of radio signals in at least one of different spatial directions and at different times, one or more of the infrastructure equipment each being configured to communicate with one or more communications devices via an access link, the method comprising communicating, with one of the infrastructure equipment acting as a donor node connected to a core network, the core network being part of the wireless communications network, signals representing data by a second of the infrastructure equipment over a first communications path via one or more others of the infrastructure equipment acting as relay nodes, the second infrastructure equipment being a child node and a first of the one or more other infrastructure equipment acting as the relay nodes or the donor node being a parent node connected to the child node via a backhaul communications link and configured to allocate communications resources to the child node, detecting, by the first infrastructure equipment, that one or more of the beams used for communicating signals with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment, determining, by the first infrastructure equipment in response to detecting that the one or more of the beams satisfy the beam failure condition, that a beam failure notification is to be transmitted to the child node, the beam failure notification indicating that the one or more of the beams satisfy the beam failure condition, and transmitting, by the first infrastructure equipment to the child node, the beam failure notification.

Paragraph 45. A wireless communications network comprising a plurality of infrastructure equipment each being configured to communicate with one or more others of the infrastructure equipment via a backhaul communications link by periodically transmitting a plurality of beams of radio signals in at least one of different spatial directions and at different times, one or more of the infrastructure equipment each being configured to communicate with one or more communications devices via an access link, wherein a second of the infrastructure equipment comprises transceiver circuitry and controller circuitry which are configured in combination to communicate, with one of the infrastructure equipment acting as a donor node connected to a core network, the core network being part of the wireless communications network, signals representing data over a first communications path via one or more others of the infrastructure equipment acting as relay nodes, the second infrastructure equipment being a child node and a first of the one or more other infrastructure equipment acting as the relay nodes or the donor node being a parent node connected to the child node via a backhaul communications link and configured to allocate communications resources to the child node, and wherein the first infrastructure equipment comprises transceiver circuitry and controller circuitry which are configured in combination to detect that one or more of the beams used for communicating signals with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment, to determine, in response to detecting that the one or more of the beams satisfy the beam failure condition, that a beam failure notification is to be transmitted to the child node, the beam failure notification indicating that the one or more of the beams satisfy the beam failure condition, and to transmit, to the child node, the beam failure notification.

Paragraph 46. Circuitry for a wireless communications network comprising a plurality of infrastructure equipment each being configured to communicate with one or more others of the infrastructure equipment via a backhaul communications link by periodically transmitting a plurality of beams of radio signals in at least one of different spatial directions and at different times, one or more of the infrastructure equipment each being configured to communicate with one or more communications devices via an access link, wherein a second of the infrastructure equipment comprises transceiver circuitry and controller circuitry which are configured in combination to communicate, with one of the infrastructure equipment acting as a donor node connected to a core network, the core network being part of the wireless communications network, signals representing data over a first communications path via one or more others of the infrastructure equipment acting as relay nodes, the second infrastructure equipment being a child node and a first of the one or more other infrastructure equipment acting as the relay nodes or the donor node being a parent node connected to the child node via a backhaul communications link and configured to allocate communications resources to the child node, and wherein the first infrastructure equipment comprises transceiver circuitry and controller circuitry which are configured in combination to detect that one or more of the beams used for communicating signals with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment, to determine, in response to detecting that the one or more of the beams satisfy the beam failure condition, that a beam failure notification is to be transmitted to the child node, the beam failure notification indicating that the one or more of the beams satisfy the beam failure condition, and to transmit, to the child node, the beam failure notification.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170831, "New SID Proposal: Study on Integrated Access and Backhaul for NR", AT&T, 3GPP RAN Meeting #75, Dubrovnik, Croatia, March 2017.
[4] 3GPP TTR 38.874 "$3^{rd}$ Generation Partnership Project; Technical Specification Group Radio Access Network; Study on Integrated Access and Backhaul; (Release 15)", $3^{rd}$ Generation Partnership Project, February 2018.
[5] R2-1801606, "Proposals on IAB Architecture", Qualcomm et al, 3GPP TSG-RAN WG2 NR Ad hoc 1801, Vancouver, Canada, Jan. 22-26, 2018.
[6] R3-181502, "Way Forward—IAB Architecture for L2/3 relaying", Qualcomm et al, 3GPP TSG-RAN WG3 Meeting #99, Athens, Greece, Feb. 26-Mar. 2, 2018.
[7] R3-185312, "IAB failure recovery as part of route management", Samsung, 3GPP TSG-RAN WG3 Meeting #101, Gothenburg, Sweden, Aug. 20-24, 2018.
[8] TS 38.300, "NR and NG-RAN Overall Description; Stage 2 (Release 15)", 3rd Generation Partnership Project.

What is claimed is:

1. A method of operating a first infrastructure equipment forming part of a wireless communications network comprising a plurality of other infrastructure equipment, the first infrastructure equipment being configured to communicate with one or more of the plurality of other infrastructure equipment via a backhaul communications link by periodically transmitting a plurality of beams of radio signals in at least one of different spatial directions and at different times, one or more of the first infrastructure equipment and the plurality of other infrastructure equipment each being configured to communicate with one or more communications devices via an access link, wherein the first infrastructure equipment is either a donor node connected to a core network part of the wireless communications network or a relay node configured to relay signals between a donor node and one or more of the plurality of other infrastructure equipment, the method comprising communicating signals representing data with a second of the infrastructure equipment over a first communications path optionally via one or more others of the infrastructure equipment acting as relay nodes, the second infrastructure equipment being a child node and the first infrastructure equipment being a parent node connected to the child node via a backhaul communications link and configured to allocate communications resources to the child node, detecting that one or more of the plurality of beams used for communicating signals with a third of the infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment, determining, in response to detecting that the one or more of the plurality of beams satisfy the beam failure condition, that a beam failure notification is to be transmitted to the child node, the beam failure notification indicating that the one or more of the plurality of beams satisfy the beam failure condition, and transmitting, to the child node, the beam failure notification.

2. The method according to claim 1, wherein the beam failure notification is transmitted to the child node via at least one of: dedicated radio resource control, RRC, signalling over the first communications path, broadcast signalling, a medium access control, MAC, control element, CE, over the first communications path, and physical layer signalling over the first communications path.

3. The method according to claim 1, wherein the beam failure notification comprises an indication of an identifier of the third infrastructure equipment and an indication of a notification type of the beam failure notification.

4. The method according to claim 1, comprising comparing a number of the one or more of the plurality of beams that satisfy the beam failure condition with a beam failure instance threshold within a predetermined period, and determining that the beam failure notification is to be transmitted to the child node only if the number of the one or more of the beams that satisfy the beam failure condition exceeds the beam failure instance threshold within the predetermined period.

5. The method according to claim 1, comprising transmitting, to the child node in advance of initiating a beam failure recovery procedure, a beam failure recovery notification indicating that the first infrastructure equipment is going to initiate the beam failure recovery procedure.

6. The method according to claim 5, wherein the beam failure recovery notification is transmitted to the child node via at least one of: dedicated RRC signalling over the first communications path, broadcast signalling, a MAC CE over the first communications path, and physical layer signalling over the first communications path.

7. The method according to claim 5, wherein the beam failure recovery notification comprises an indication of an identifier of the third infrastructure equipment and an indication of a notification type of the beam failure recovery notification.

8. The method according to claim 5, comprising initiating the beam failure recovery procedure, wherein the beam failure recovery procedure comprises performing a random access, RACH, procedure to initiate communication with the third infrastructure equipment using one or more new beams instead of the one or more of the beams that satisfy the beam failure condition.

9. The method according to claim 5, comprising determining that the beam failure recovery procedure has been successfully completed, and transmitting, to the child node subsequently to determining that the beam failure recovery procedure has been successfully completed, a beam failure recovery success notification indicating that the first infrastructure equipment has successfully completed the beam failure recovery procedure.

10. The method according to claim 9, wherein the beam failure recovery success notification is transmitted to the child node via at least one of: dedicated RRC signalling over the first communications path, broadcast signalling, a MAC CE over the first communications path, and physical layer signalling over the first communications path.

11. The method according to claim 9, wherein the beam failure recovery success notification comprises an indication of an identifier of the third infrastructure equipment and an indication of a notification type of the beam failure recovery success notification.

12. The method according to claim 1, comprising determining, in response to detecting that the one or more of the plurality of beams satisfy the beam failure condition, that a radio link failure, RLF, between the first infrastructure equipment and the third infrastructure equipment has been triggered, and transmitting an indication of the RLF to the child node.

13. The method according to claim 1, wherein each of the plurality of beams is associated with one of a plurality of transmission configuration indication, TCI, states.

14. The method according to claim 1, wherein the beam failure condition comprises a determination by the first infrastructure equipment that a measured characteristic of signals received and/or transmitted using the one or more of the plurality of beams that satisfy the beam failure condition falls below a predetermined threshold.

15. The method according to claim 14, wherein the measured characteristic is at least one of a relative quality of the received and/or transmitted signals, a power with which the signals are received and/or transmitted, and an error rate of the received and/or transmitted signals.

16. The method according to claim 1, wherein the beam failure condition comprises receiving, by the first infrastructure equipment, a beam failure instance notification from the third infrastructure equipment indicating that the one or more of the plurality of beams that satisfy the beam failure condition have failed.

17. The method according to claim 1, wherein the donor node is a central unit node and is directly connected to the core network.

18. The method according to claim 1, wherein the donor node is connected to the core network via a central unit node.

19. A first infrastructure equipment forming part of a wireless communications network comprising a plurality of other infrastructure equipment, the first infrastructure equipment being configured to communicate with one or more of the plurality of other infrastructure equipment via a backhaul communications link by periodically transmitting a plurality of beams of radio signals in at least one of different spatial directions and at different times, one or more of the first infrastructure equipment and the plurality of other infrastructure equipment each being configured to communicate with one or more communications devices via an access link, wherein the first infrastructure equipment is either a donor node connected to a core network part of the wireless communications network or a relay node configured to relay signals between a donor node and one or more of the plurality of other infrastructure equipment, wherein the first infrastructure comprises transceiver circuitry and controller circuitry which are configured in combination to communicate signals representing data with a second of the infrastructure equipment over a first communications path optionally via one or more others of the infrastructure equipment acting as relay nodes, the second infrastructure equipment being a child node and the first infrastructure equipment being a parent node connected to the child node via a backhaul communications link and configured to allocate communications resources to the child node, to detect that one or more of the plurality of beams used for communicating signals with a third of the infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment, to determine, in response to detecting that the one or more of the plurality of beams satisfy the beam failure condition, that a beam failure notification is to be transmitted to the child node, the beam failure notification indicating that the one or more of the plurality of beams satisfy the beam failure condition, and to transmit, to the child node, the beam failure notification.

20. A circuitry for a first infrastructure equipment forming part of a wireless communications network comprising a plurality of other infrastructure equipment, the first infrastructure equipment being configured to communicate with one or more of the plurality of other infrastructure equipment via a backhaul communications link by periodically transmitting a plurality of beams of radio signals in at least one of different spatial directions and at different times, one or more of the first infrastructure equipment and the plurality of other infrastructure equipment each being configured to communicate with one or more communications devices via an access link, wherein the first infrastructure equipment is either a donor node connected to a core network part of the wireless communications network or a relay node configured to relay signals between a donor node and one or more of the plurality of other infrastructure equipment, wherein the first infrastructure comprises transceiver circuitry and controller circuitry which are configured in combination to communicate signals representing data with a second of the infrastructure equipment over a first communications path optionally via one or more others of the infrastructure equipment acting as relay nodes, the second infrastructure equipment being a child node and the first infrastructure equipment being a parent node being connected to the child node via a backhaul communications link and configured to allocate communications resources to the child node, to detect that one or more of the plurality of beams used for communicating signals with a third infrastructure equipment satisfy a beam failure condition, the third infrastructure equipment being either of the donor node or one of the one or more others of the infrastructure equipment acting as relay nodes, and the third infrastructure equipment being a parent node to the first infrastructure equipment, to determine, in response to detecting that the one or more of the plurality of beams satisfy the beam failure condition, that a beam failure notification is to be transmitted to the child node, the beam failure notification indicating that the one or more of the plurality of beams satisfy the beam failure condition, and to transmit, to the child node, the beam failure notification.

* * * * *